(12) United States Patent
Liu

(10) Patent No.: US 12,273,233 B2
(45) Date of Patent: Apr. 8, 2025

(54) RECEIVING DEVICE AND OPERATION METHOD THEREOF

(71) Applicant: Wistron Corporation, New Taipei (TW)

(72) Inventor: Wei-Lun Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 67 days.

(21) Appl. No.: 18/301,267

(22) Filed: Apr. 17, 2023

(65) Prior Publication Data

US 2024/0250866 A1      Jul. 25, 2024

(30) Foreign Application Priority Data

Jan. 19, 2023   (TW) .................................. 112102585

(51) Int. Cl.
| | |
|---|---|
| *H04L 41/0663* | (2022.01) |
| *G06F 11/20* | (2006.01) |
| *H04L 41/0631* | (2022.01) |

(52) U.S. Cl.
CPC ...... *H04L 41/0663* (2013.01); *G06F 11/2028* (2013.01); *H04L 41/064* (2013.01); *G06F 2212/1032* (2013.01)

(58) Field of Classification Search
CPC ......... G06F 11/2028; G06F 2212/1032; G06F 11/00; H04L 41/0663; H04L 41/064; G11B 19/041; G11B 20/025; G11B 20/1037; G11B 27/36
USPC ........................................................ 386/263
See application file for complete search history.

(56) References Cited

U.S. PATENT DOCUMENTS

| | | | |
|---|---|---|---|
| 2017/0287102 A1* | 10/2017 | Anantharaman | G09G 5/006 |
| 2021/0350237 A1* | 11/2021 | Litichever | G06N 3/08 |

* cited by examiner

*Primary Examiner* — Thai Q Tran
*Assistant Examiner* — Nienru Yang
(74) *Attorney, Agent, or Firm* — JCIPRNET

(57) ABSTRACT

A receiving element and operation method thereof are provided. The receiving element includes a data transmission element, master receiving element, and slave receiving element. The data transmission element converts a first video data into a second video data. The master receiving element receives the second video data and determines whether the second video data is normal or abnormal. The slave receiving element receives a control signal from the master receiving element and the second video data. In response to the master receiving element determining that the second video data is normal, the control signal is output to control the slave receiving element into standby mode, and the second video data is converted into a display signal. Alternatively, in response to the master receiving element determining that the second video data is abnormal, the control signal is output, and the received second video data is converted into a display signal.

20 Claims, 12 Drawing Sheets

| Field name | Data size |
|---|---|
| Head ID | 2Bytes |
| Video data | 512Bytes |
| CRC-packet | 4Bytes |

FIG. 8A

| Field name | Data size |
|---|---|
| Head ID | 2Bytes |
| Video data | 512Bytes |
| CRC-video frame | 4Bytes |
| CRC-packet | 4Bytes |

FIG. 8B

| Field name | Data size |
|---|---|
| Head ID | 2Bytes |
| Video data | 512Bytes |
| CRC-packet | 4Bytes |

RECEIVING DEVICE AND OPERATION METHOD THEREOF

CROSS-REFERENCE TO RELATED APPLICATION

This application claims the priority benefit of Taiwan application serial no. 112102585, filed on Jan. 19, 2023. The entirety of the above-mentioned patent application is hereby incorporated by reference herein and made a part of this specification.

BACKGROUND

Technical Field

The disclosure relates to a receiving device and an operation method thereof.

Description of Related Art

Generally, in a receiving device of an LED wall, whether a video signal at an input terminal is reliably transmitted as a real output signal to an LED board of the LED wall at an output terminal is not checked during a process of video signal transmission. Therefore, if the receiving device is partially damaged, a backup device cannot be enabled in real-time.

Therefore, it is required to use a receiving device using a redundant design and reliably make use of an effect of the redundant design to address to an issue that the LED wall cannot display a predetermined video image, and to have a trustworthy backup system solution.

SUMMARY

The disclosure is directed to a receiving device and an operation method thereof, where the receiving device uses packet detection and current comparison detection as an enabling mechanism of a backup device or backup system.

Some embodiments of the disclosure provide a receiving device. The receiving device includes a data transmission element, a master receiving element, and a slave receiving element. The data transmission element converts a first video data into a second video data. The master receiving element is coupled to the data transmission element, receives the second video data, and determines whether the second video data is normal or abnormal. The slave receiving element is coupled to the master receiving element and the data transmission element, and receives a control signal from the master receiving element and the second video data. In response to the master receiving element determining that the second video data is normal, the control signal is output by the master receiving element to control the slave receiving element to enter a standby mode, and the second video data is converted into a display signal. Alternatively, in response to the master receiving element determining that the second video data is abnormal, the control signal is output by the master receiving element, and the received second video data is converted into the display signal by the slave receiving element via the control signal.

Some embodiments of the disclosure provide an operation method of a receiving device, which includes the followings. A first video data is converted into a second video data. The second video data is received and whether the second video data is normal or abnormal is determined by a master receiving element. A control signal from the master receiving element and the second video data are received by a slave receiving element. In response to the master receiving element determining that the second video data is normal, the control signal is output by the master receiving element to control the slave receiving element to enter a standby mode, and the second video data is converted into a display signal. Alternatively, in response to the master receiving element determining that the second video data is abnormal, the control signal is output by the master receiving element, and the received second video data is converted into the display signal by the slave receiving element via the control signal.

Based on the above description, the disclosure uses a receiving device with a redundant design to support packet detection of video data and current comparison detection that dynamically calculates a consumed current based on the input data and measures an actual consumed current to determine whether the device fails as an enabling mechanism of a backup device or backup system, which is convenient for terminal users to enable the backup device in real-time when the receiving device is partially damaged, without worrying about the problem that the video data is not transmitted to the LED wall in real-time due to signal transmission errors or internal system damage.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 8A to FIG. 8C are data structure configuration diagrams of each video frame packet according to an embodiment of the disclosure.

DESCRIPTION OF THE EMBODIMENTS

Figure 1:
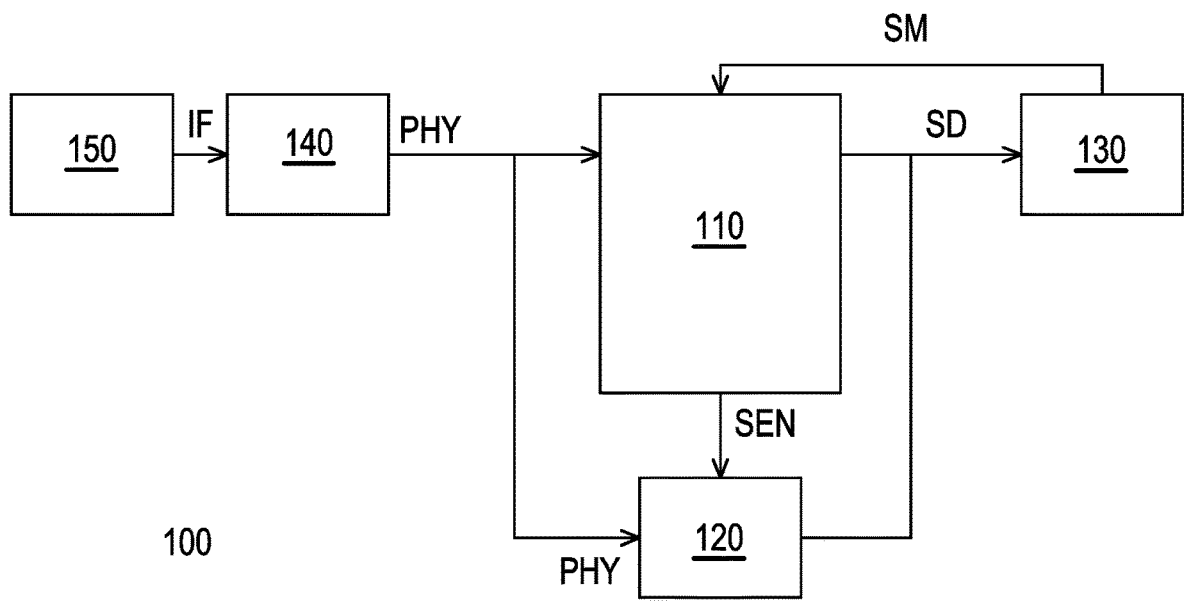
FIG. 1 is a schematic diagram of a receiving device according to an embodiment of the disclosure.

Hereinafter, embodiments will be described in more detail with reference to the accompanying drawings, in which like reference numerals refer to like elements throughout. However, the disclosure may be embodied in various different forms and should not be construed as limited to only the embodiments set forth herein. In the drawings, relative sizes of elements, layers and regions may be exaggerated for clarity's sake.

In the following descriptions, various embodiments may be practiced without these specific details or with one or more equivalent arrangements. In other instances, well-known structures and devices are shown in a block diagram form in order to avoid unnecessarily obscuring the various embodiments.

As used herein, unless the context clearly dictates otherwise, the singular form "a/an" is intended to include the plural forms as well. It will be further understood that the terms "comprises/comprising", "have/having" and "includes/including" when used in this specification indicate the presence of stated features, integers, steps, operations, elements and/or components, but does not exclude the presence or addition of one or more other features, integers, steps, operations, elements, components and/or groups thereof. As used herein, the term "and/or" includes any and all combinations of one or more of the associated listed items.

When an embodiment may be implemented in different ways, a particular processing order may be executed differently than that described. For example, two consecutively described processes may be performed substantially simultaneously or in an order reverse to the described order.

FIG. 1 is a schematic diagram of a receiving device according to an embodiment of the disclosure, but this is only for the convenience of description, and is not intended to limit the disclosure.

Referring to FIG. 1, in an embodiment, a receiving device 100 includes a master receiving element 110, a slave receiving element 120 and a data transmission element 140. In an embodiment, the receiving device 100 further includes an LED board 130 and a data output element 150. In an embodiment, the receiving device 100 is one of an LED subtitle machine, a marquee, a video wall, an electronic billboard, or an advertising light box, which is not limited by the embodiment.

In an embodiment, the data transmission element 140 receives a first video data from the data output element 150 through a transmission interface IF, and converts the first video data into a second video data. In an embodiment, the data output element 150 is a personal computer (PC) or other data output elements, which is not limited by the embodiment. In an embodiment, the first video data is, for example, video data, video data or playback media, which is not limited by the embodiment. In an embodiment, the transmission interface IF may be a fully digitized image and audio transmission interface, such as a high definition multimedia interface (HDMI), which may be used to simultaneously transmit uncompressed audio and video signals. Where, the transmission interface IF may be used to support devices such as set-top boxes, DVD players, personal computers, video game consoles, digital audio and televisions. In an embodiment, the data transmission element 140 is, for example, a video send box, which is not limited by the embodiment.

For example, the data transmission element 140 converts the first video data (for example, in an HDMI data format) received through the transmission interface IF into the second video data (for example, in an RJ45 data format), and then sends it to the master receiving element 110. Where, the RJ45 data format is applied to the connection of network equipment between a local area network and broadband network users. In an embodiment, an RJ45 transformer (not shown) may be configured in the data transmission element 140, for example, configured between a network physical layer device PHY and an RJ45 connector to isolate a chip from the connector of the data transmission element 140, so as to improve quality and speed of data signal transmission and reduce low-frequency signal interference.

In an embodiment, the master receiving element 110 is coupled to the data transmission element 140 and the slave receiving element 110. The master receiving element 110 receives the second video data through a port physical layer or a network physical layer device PHY, and determines whether the second video data is normal or abnormal. In response to the master receiving element 110 determining that the second video data is correct or normal, the master receiving element 110 outputs an enable control signal SEN to disable (not enable, not activate) the slave receiving element 120, and controls the slave receiving element 120 to enter a standby mode. The master receiving element 110 then converts the received second video data into an LED display signal SD, and outputs the LED display signal SD to the LED board 130. Light-emitting elements (for example, light-emitting diodes (LED) beads) are driven on the LED board 130 via the LED display signal SD. In an embodiment, the master receiving element 110 receives a current monitor signal SM from the LED board 130 to monitor a current consumption value of the LED board 130 in real-time.

In an embodiment, the slave receiving element 120 is coupled to the master receiving element 110 and the data transmission element 140. The slave receiving element 120 receives the enable control signal SEN of the master receiving element 110 and the second video data from the master receiving element 110. In response to the master receiving element 110 determining that the second video data is incorrect or abnormal, the master receiving element 110 outputs the enable control signal SEN to enable the slave receiving element 120 and disable the master receiving element 110 (i.e., to stop the operation of the master receiving element 110). The slave receiving element 120 then converts the received second video data into the LED display signal SD via the enable control signal SEN and outputs the LED display signal SD to the LED board 130.

In an embodiment, when the receiving device 100 operates, one of the master receiving element 110 and the slave receiving element 120 converts the second video data into the LED display signal SD.

In an embodiment, the LED board 130 is coupled to the master receiving element 110 and the slave receiving element 120. The LED board 130 is configured to receive the LED display signal SD. A plurality of light-emitting elements are driven on the LED board 130 via the LED display signal SD. The LED board 130 outputs a third video data (for example, a video frame on an LED wall, which is not limited by the embodiment).

In an embodiment, the LED board 130 is used to display images. According to actual applications, the LED board 130 may be a liquid crystal display (LCD), an electronic paper display (EPD), polymer-dispersed liquid crystal, cholesteric liquid crystal, a light-emitting diode (LED) display, a field emission display (FED), an organic light-emitting diode (OLED) display, an active-matrix organic light-emitting diode (AMOLED) display, a flexible display, a transparent light-emitting diode display or other display units that provide display functions. According to actual requirements, the LED board 130 may be applied to a main screen of an electronic device, an auxiliary screen (such as a touch bar) or other display applications capable of implementing touch input. In design examples of some simple applications, the LED board 130 may be any display board without a touch sensing function. In an embodiment, the LED board 130 is an LED wall. For example, the LED board 130 is an LED wall formed by a plurality of LED boards, where each LED board has a receiving card (not shown) to drive the LED beads on the LED board.

Figure 2:
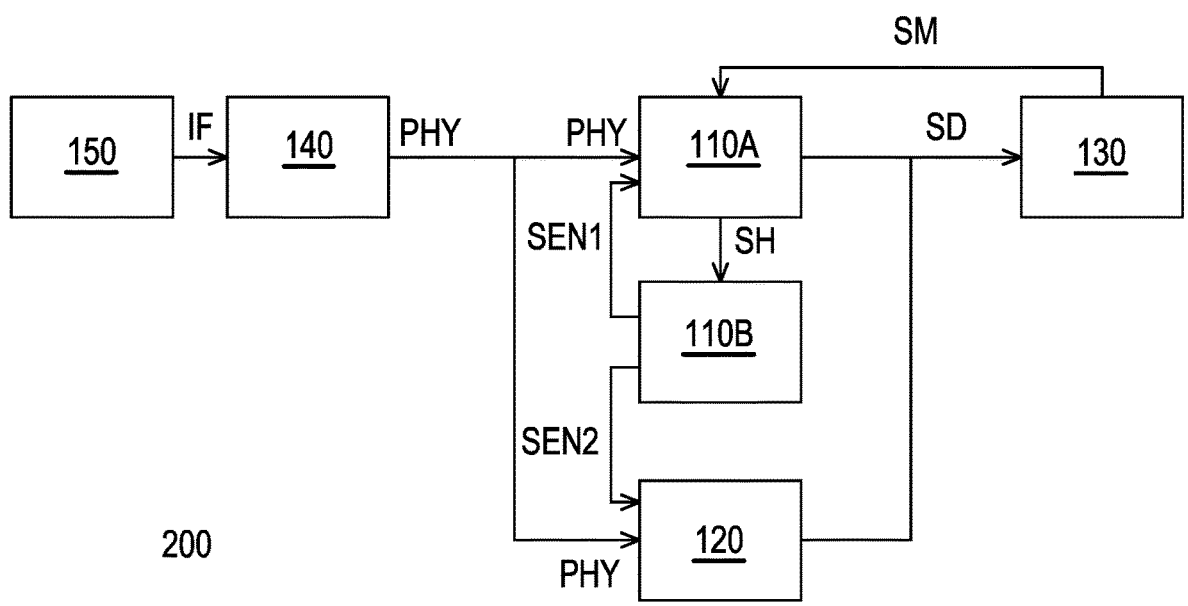
FIG. 2 is a schematic diagram of a receiving device according to an embodiment of the disclosure.

FIG. 2 is a schematic diagram of a receiving device according to another embodiment of the disclosure, but this is only for the convenience of description, and is not intended to limit the disclosure.

Referring to FIG. 2, in an embodiment, a receiving device 200 includes a master receiving element 110A, a monitor device 110B, the slave receiving element 120 and the data transmission element 140. In an embodiment, the receiving device 200 further includes the LED board 130 and the data output element 150. In an embodiment, the data transmission element 140 is coupled to the data output element 150, the master receiving element 110A and the slave receiving element 120. The master receiving element 110A is coupled to the slave receiving element 120, the monitor device 110B and the LED board 130. The slave receiving element 120 is coupled to the master receiving element 110, the monitor device 110B and the LED board 130.

In an embodiment, the master receiving element 110A receives the second video data from the data transmission element 140 through a network physical layer or a network physical layer device PHY, and the monitor device 110B determines whether the second video data is normal or abnormal. In response to the monitor device 110B determining that the second video data is correct or normal, the monitor device 110B outputs an enable control signal SEN2 to disable the slave receiving element 120, and controls the slave receiving element 120 to enter the standby mode. The monitor device 110B receives a health signal SH to confirm that the second video data is normal, and then outputs the enable control signal SEN1 to enable the master receiving element 110A, and the master receiving element 110A converts the received second video data into the LED display signal SD, and outputs the LED display signal SD to the LED board 130. The light-emitting elements are driven on the LED board 130 via the LED display signal SD. In an embodiment, the master receiving element 110A receives a current monitor signal SM from the LED board 130 to monitor a current consumption value of the LED board 130 in real-time.

In an embodiment, if the monitor device 110B does not receive a normal notification signal SH within a predetermined time (for example, within one second, which may be set according to actual usage requirements, and is not limited by the embodiment), in response to the monitor device 110B determining that the second video data is incorrect or abnormal, the monitor device 110B outputs the enable control signal SEN2 to enable (or activate) the slave receiving element 120 and outputs the enabling control signal SEN1 to disable the master receiving element 110A (i.e., stop the operation of the master receiving element 110A).

The receiving element 120 then converts the second video data received from the data transmission element 140 through the network physical layer or the network physical layer device PHY into the LED display signal SD via the enable control signal SEN2 and outputs the LED display signal SD to the LED board 130.

In an embodiment, when the receiving device 200 operates, one of the master receiving element 110A and the slave receiving element 120 converts the second video data into the LED display signal SD.

In an embodiment, the LED board 130 is configured to receive the LED display signal SD. A plurality of light-emitting elements are driven on the LED board 130 via the LED display signal SD. The LED board 130 outputs a third video data (for example, a video frame on an LED wall, which is not limited by the embodiment).

Figure 3:
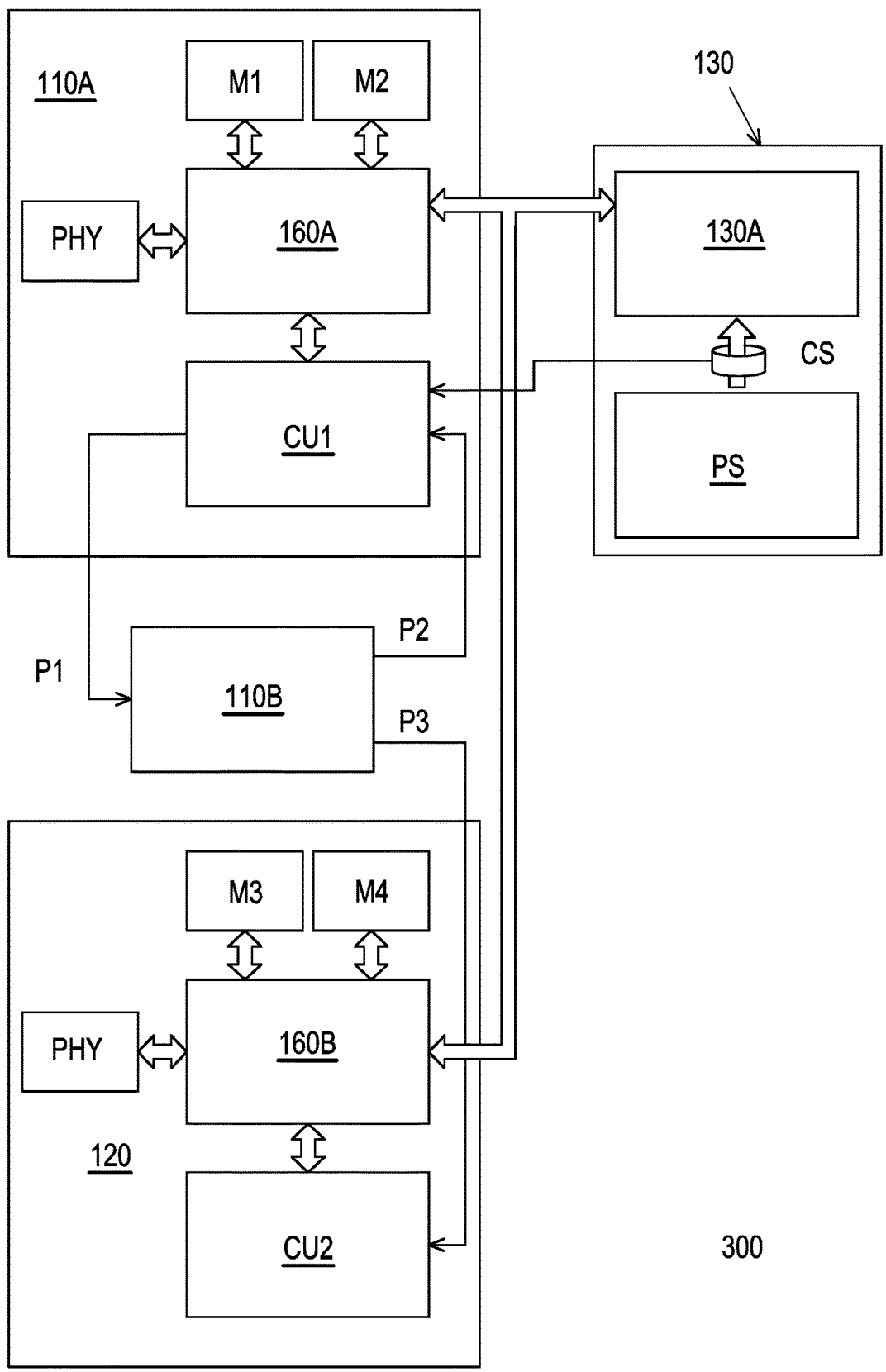
FIG. 3 is a partial schematic diagram of a receiving device according to an embodiment of the disclosure.

FIG. 3 is a partial schematic diagram of a receiving device according to an embodiment of the disclosure.

Referring to FIG. 3, in an embodiment, a receiving device 300 includes the master receiving element 110A, the monitor device 110B, and the slave receiving element 120. In an embodiment, the receiving device 200 further includes the LED board 130. In an embodiment, the master receiving element 110A is coupled to the slave receiving element 120, the monitor device 110B and the LED board 130. The slave receiving element 120 is coupled to the master receiving element 110, the monitor device 110B and the LED board 130.

In an embodiment, the master receiving element 110A includes a first memory unit M1, a second memory unit M2, a network physical layer device PHY, a processing circuit 160A, and a control unit CU1. The processing circuit 160A is coupled to the first memory unit M1, the second memory unit M2, the network physical layer device PHY, and the control unit CU1.

In an embodiment, the first memory unit M1 is, for example, a double-data-rate three synchronous dynamic random access memory (DDR3 SDRAM), which is not limited by the disclosure. The first memory unit M1 may be configured to store video data. For example, the first memory unit M1 stores video frame data, a gamma table, pixel color correction matrix (CCM) data, but the disclosure is not limited thereto.

In an embodiment, the second memory unit M2 is, for example, any type of fixed or removable random access memory (RAM), read-only memory (ROM), flash memory, hard disk or similar components or a combination of the above components, and is used to store computer programs executable by the processing circuit 160A. In an embodiment, the second memory unit M2 is used to store at least one of the gamma data table, the pixel color correction matrix data, and setting data of the LED board 130. In an embodiment, the first memory unit M1 and the second memory unit M2 are an integral storage device block. In an embodiment, the first memory unit M1 and the second memory unit M2 may call storage resources from each other.

In an embodiment, the processing circuit 160A is configured to store video or image data into the first memory unit M1 and/or the second memory unit M2 through the network physical layer device PHY. In an embodiment, the processing circuit 160A is configured to read the video data from the first memory unit M1 and/or the second memory unit M2, perform color conversion through the gamma data table and the color correction matrix, and transmit the converted display data (or display signal) to the LED board 130. In an embodiment, the processing circuit 160A is configured to calculate a total current value consumed by the LED board 130.

In an embodiment, the processing circuit 160A is configured to access the setting data required by the receiving device 300 to the first memory unit M1 and/or the second memory unit M2. In an embodiment, the processing circuit 160A is configured to accept control of the control unit CU1 to control a display process of a light-emitting module 130A of the LED board 130. In an embodiment, the processing circuit 160A is, for example, a central processing unit (CPU), or other programmable general purpose or special purpose microprocessor, microcontroller, digital signal processor (DSP), programmable controller, application specific integrated circuit (ASIC), programmable logic device (PLD) or other similar devices or combinations of these devices, which is not limited by the disclosure. According to actual design requirements, related functions of the processing circuit 160A may be implemented as hardware by using hardware description languages (such as Verilog HDL or VHDL) or other suitable programming languages.

For example, the related functions of the processing circuit 160A may be implemented in one or more microcontrollers, microprocessors, application-specific integrated circuits (ASIC), digital signal processors (DSP), field programmable gate array (FPGA) and/or various logic blocks, modules and circuits in other processing units. In terms of software and/or firmware, related functions of the processing circuit 160A may be implemented as programming codes. For example, the above functions may be implemented by using general programming languages (for example, C, C++ or assembly language) or other suitable programming languages. The programming codes may be recorded/stored in a "non-transitory computer readable medium", for example, a read only memory (ROM), a tape, a disk, a card, a semiconductor memory, a programmable logic circuit and/or a storage device. A central processing unit (CPU), a microcontroller or a microprocessor may read the program codes from the non-transitory computer readable medium and execute the same to achieve related functions.

In an embodiment, the control unit CU1 is configured to control an enable function and a disable function of the master receiving element 110A. In an embodiment, the control unit CU1 is configured to receive a synchronization packet signal (VSYN) and the total current value consumed by the LED board 130 from the processing circuit 160A. In an embodiment, the synchronization packet signal is at least one of a voltage signal or a current signal. In an embodiment, the control unit CU1 is configured to read current data sensed by the current sensor CS. In an embodiment, the control unit CU1 may be implemented by hardware, software, firmware or a combination thereof. In particular, the control unit CU1 may be implemented by a microcontroller (MCU), a processor, a circuit, a computer and/or other electronic data processing devices. For example, a processor, computer, server, or other electronic data processing device that may embody the control unit CU1 may be provided, supplied, and/or programmed into a suitable program code (for example, source code, interpreted code, object code, direct executable code, etc.) or other similar instructions, software or firmware, so that when it is run and/or executed by a computer or other electronic data processing device, one or more tasks, steps, procedures, methods and/or functions described herein may be implemented.

In an embodiment, the monitor device 110B may be formed by an MCU, which is not limited by the embodiment. After the monitor device 110B receives the normal notification signal SH transmitted from the control unit CU1 through the pulse signal transmission path P1 and determines that the second video data is normal, the monitor device 110B respectively controls the control unit CU1 of the master receiving element 110A and the control unit CU2 of the slave receiving element 120 through enabling (disabling) paths P2 and P3, and controls one of them to operate at one time. The monitor device 110B may enable the master receiving element 110A and let the slave receiving element 120 to enter the standby mode when the receiving device 300 is in a normal operation state, and may stop the operation of the master receiving element 110A and enable the slave receiving element 120 when detecting an abnormal operation of the master receiving element 110A (for example, receiving wrong video data or transmitted video frames).

In an embodiment, the network physical layer device PHY is a device that operates a physical layer of an open system interconnection model (OSI model). The network physical layer device PHY connects a data link layer device to a physical medium, such as optical fiber or a copper cable. The network physical layer device PHY is a bottom layer of the OSI model, and is used to define bit data transmission between the network devices, and may transmit electronic signals of 0 and 1 on wires or other physical wires to form a data transmission network. The network physical layer device PHY has a specification, a transmission speed, and a voltage value of data transmission of a transmission cable, and is used to ensure that the signals may be transmitted on various physical media.

For example, the network physical layer device PHY may be a network cable, a network card and a hub. The network cable includes an RJ-45 unshielded twisted pair (UTP), a coaxial cable used in cable TV, and optical fiber cable used in network. In an embodiment, regarding a wireless network, as long as it is a medium that may transmit radio waves, it belongs to the transmission medium of the network physical layer device PHY. In an embodiment, the network physical layer device PHY includes a physical coding sublayer (PCS) and a physical medium dependent sublayer (PMD). In an embodiment, the network physical layer device PHY includes radio frequency, mixed signal and an analog part (usually referred to as transceiver) and a digital baseband part applied to DSP and communication logic operation (including channel code). In an embodiment, the network physical layer device PHY is integrated in a media access layer (MAC) of a system on a chip (SoC). In an embodiment, the network physical layer device PHY is a chip capable of sending and receiving Ethernet data frames. The network physical layer device PHY defines electrical and optical signals, a line status, a clock reference, data encoding, circuits, etc., required for data transmission and reception, and provides a standard interface to the data link layer device. In an embodiment, the network physical layer device PHY is a digital-analog hybrid circuit, which is in charge of receiving electrical and optical signals, and transmitting the signals to the media access layer after demodulation and digital-analog conversion.

In an embodiment, the slave receiving element 120 includes a third memory unit M3, a fourth memory unit M4, a network physical layer device PHY, a processing circuit 160B, and a control unit CU2. The processing circuit 160B is coupled to the third memory unit M1, the fourth memory unit M4, the network physical layer device PHY, and the control unit CU1. In an embodiment, the third memory unit M3 may be the same as the first memory unit M1, but the disclosure is not limited thereto.

In an embodiment, the fourth memory unit M4 may be used to store computer programs executable by the processing circuit 160B, and a function thereof is the same as that of the second memory unit M2, but the disclosure is not limited thereto. In an embodiment, the third memory unit M3 and the fourth memory unit M4 are an integral storage device block. In an embodiment, the third memory unit M3 and the fourth memory unit M4 may call storage resources from each other.

In an embodiment, the processing circuit 160B is configured to store video or image data into the third memory unit M3 and/or the fourth memory unit M4 through the network physical layer device PHY. In an embodiment, the processing circuit 160B is configured to read video data from the third memory unit M3 and/or the fourth memory unit M4, perform color conversion through the gamma data table and the color correction matrix, and transmit the converted display data (or display signal) to the LED board 130. In an embodiment, the processing circuit 160B is configured to calculate the total current value consumed by the LED board 130. In an embodiment, the processing circuit 160B is configured to access the setting data required by the receiving device 300 to the third memory unit M3 and/or the fourth memory unit M4. In an embodiment, the processing circuit 160B is configured to accept control of the control unit CU2 to control a display process of the light-emitting module 130A in the LED board 130. In an embodiment, the function of the processing circuit 160B is the same as that of the processing circuit 160A, which is not limited by the disclosure.

In an embodiment, the control unit CU2 is configured to control an enable function and a disable function of the slave receiving element 120. In an embodiment, the control unit CU2 is configured to receive a synchronization packet signal (VSYN) and the total current value consumed by the LED board 130 from the processing circuit 160A. In an embodiment, the synchronization packet signal is one of a voltage signal or a current signal. In an embodiment, the control unit CU2 is configured to read current data sensed by the current sensor CS. In an embodiment, the function of the control unit CU2 is the same as that of the control unit CU1, which is not limited by the disclosure.

In an embodiment, the LED board 130 includes a light-emitting module 130A, a power supply PS and a current sensor CS. The current sensor CS is coupled to the power supply PS and the light-emitting module 130A.

In an embodiment, the light-emitting module 130A is used to drive the LED beads, and may receive data transmitted by the processing circuit 160A or the processing circuit 160B, and output the data to the LED beads. In an embodiment, the power supply PS provides power to the master receiving element 110A, the slave receiving element 120 and the LED board 130. In an embodiment, the current sensor CS is used to measure a current consumed by the LED board 130.

Figure 4:
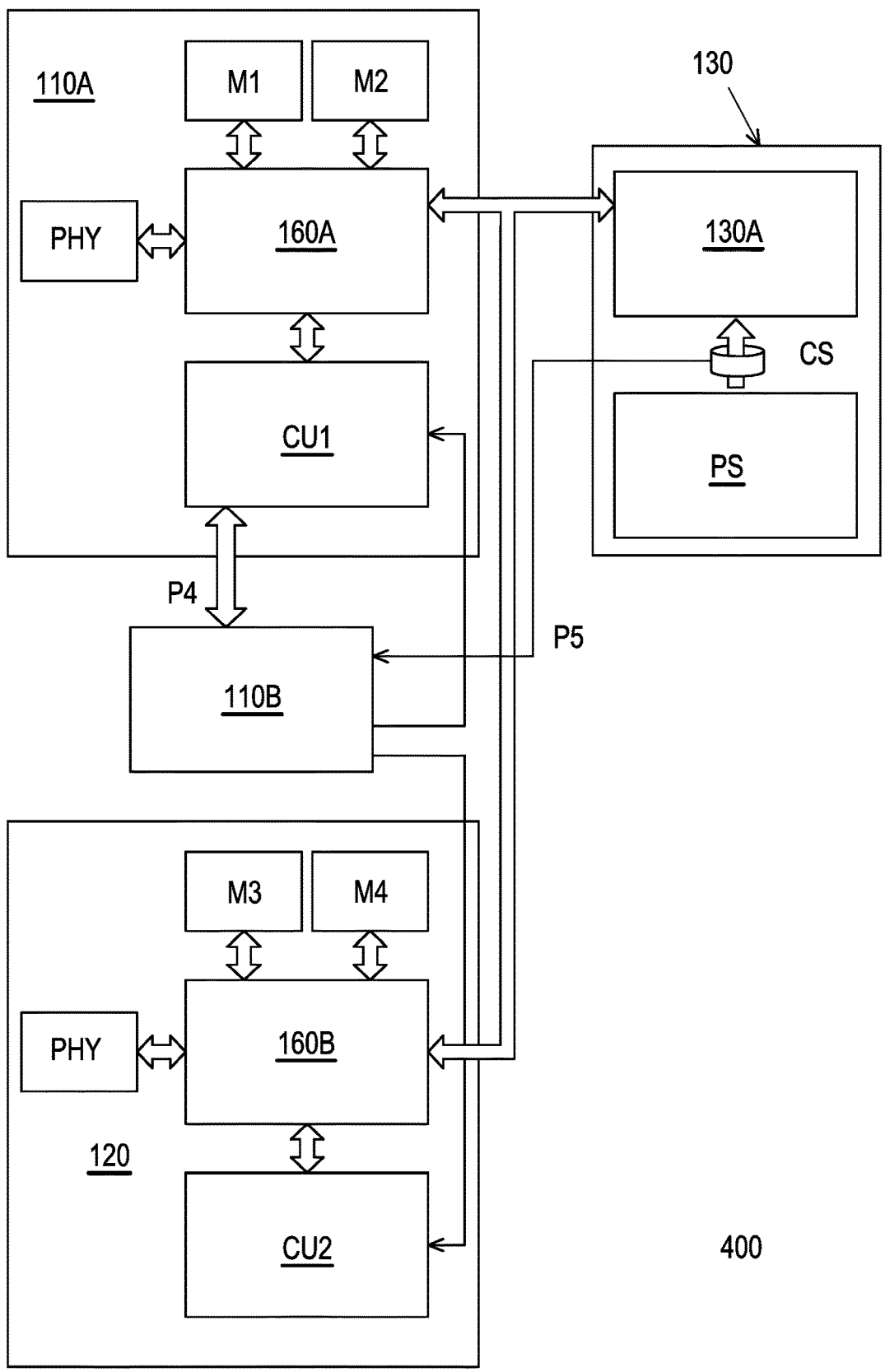
FIG. 4 is a partial schematic diagram of a receiving device according to an embodiment of the disclosure.

FIG. 4 is a partial schematic diagram of a receiving device according to another embodiment of the disclosure, but this is only for the convenience of description, and is not intended to limit the disclosure.

Referring to FIG. 4 and FIG. 2 and FIG. 3, in an embodiment, the receiving device 400 includes a master receiving element 110A, a monitor device 110B and a slave receiving element 120. In an embodiment, the receiving device 400 further includes an LED board 130. In an embodiment, the master receiving element 110A is coupled to the slave receiving element 120, the monitor device 110B and the LED board 130. The slave receiving element 120 is coupled to the master receiving element 110A, the monitor device 110B and the display panel 130. For the description of the components, reference may be made to the aforementioned description, and details thereof are not repeated here.

In an embodiment, the monitor device 110B may be formed by an MCU, which is not limited by the embodiment. The monitoring element 110B receives a total current and a synchronization packet signal transmitted from the control unit CU1 through a data bus transmission path P4, and receives current data consumed by the light-emitting module 130A and transmitted by the current sensor CS through the current detection path P5 to confirm that the data is normally transmitted, the monitor device 110B respectively controls the control unit CU1 of the master receiving element 110A and the control unit CU2 of the slave receiving element 120 through the enabling (disabling) paths P2 and P3, and controls one of them to operate at one time. In an embodiment, the data bus is implemented by a universal asynchronous receiver/transmitter (UART) interface or other interfaces, which is not limited by the embodiment.

In an embodiment, the monitor device 110B generates a time stamp and binds the time stamp with an actual consumed current of the LED board 130, and returns the same to the data output element 150 (for example, PC) through the master receiving element 110A and the data transmission element 140 to serve as a proof of play of the video or image information.

Figure 5:
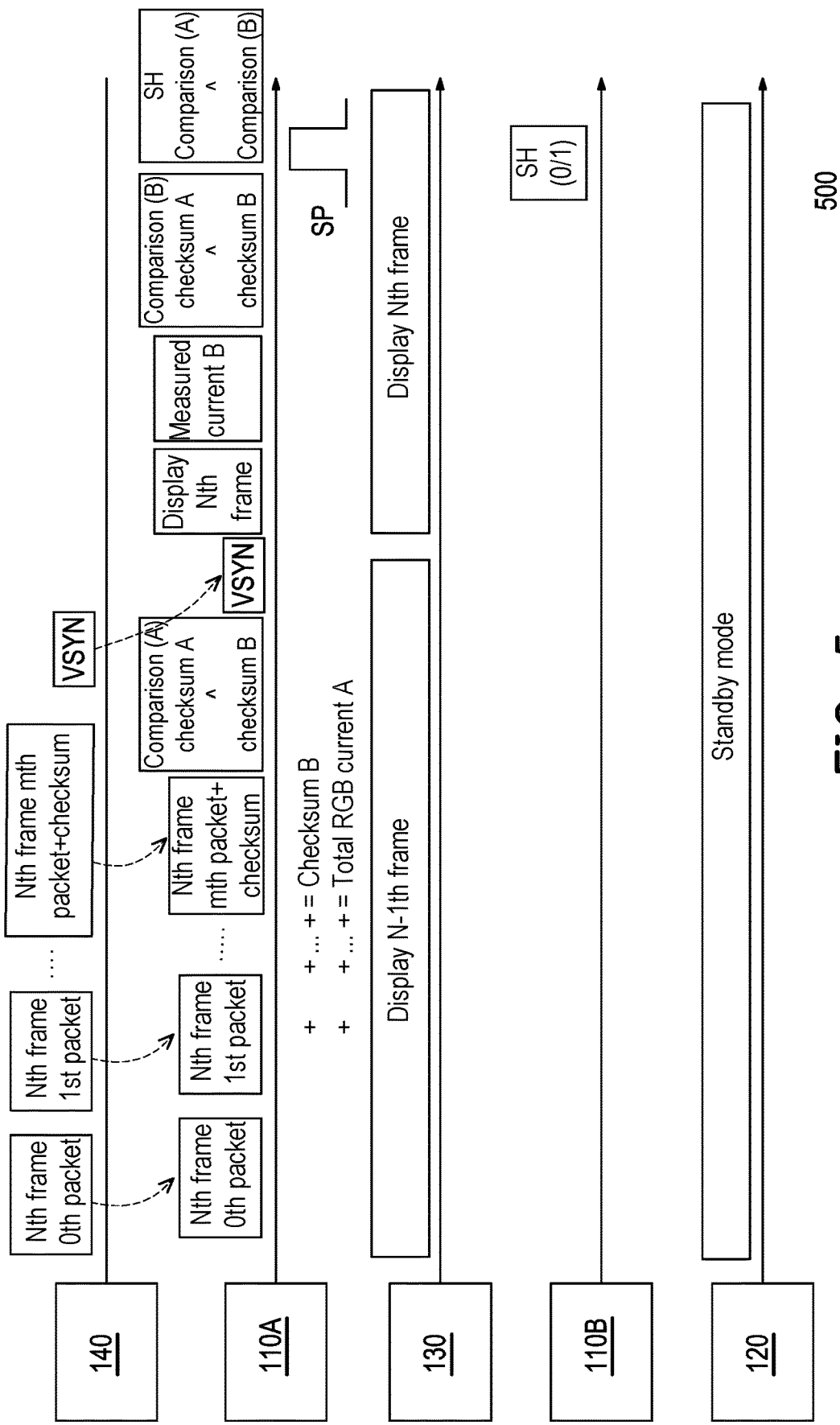
FIG. 5 is a schematic diagram of a working principle of a backup switch according to an embodiment of the disclosure.

FIG. 5 is a schematic diagram 500 of a working principle of a backup switch according to an embodiment of the disclosure, but this is only for the convenience of description, and is not intended to limit the disclosure.

Referring to FIG. 5, FIG. 1 and FIG. 2, in an embodiment, the data transmission element 140 divides an Nth video frame of the video (frequency) data or image data into 0-m packets, where N and m are non-negative integers. The data transmission element 140 then sequentially transmits the 0-mth packets of the Nth video frame to the master receiving element 110A. After receiving data in the 0th packet of the Nth video frame, the master receiving element 110A performs a video data packet checksum operation and a video frame current accumulation operation on the video data packet.

For example, the master receiving element 110A sequentially performs the checksum operation on the data in the 0th packet of the Nth video frame to the data in the mth packet of the Nth video frame, and sums up an expected (predicted) current consumed by displaying the data in the 0th packet of the Nth video frame to the data in the mth packet of the Nth video frame (i.e., calculates how much current the video packet data is expected to consume and performs accumulation) to obtain a total current, or referred to as a total RGB current A, consumed by all RGB pixels in the Nth video frame. After the data transmission element 140 sends the data in the mth packet of the Nth video frame, the data transmission element 140 adds a first checksum data (or data checksum A) of the Nth video frame to the mth packet of the Nth video frame.

In other words, after the master receiving element 110A receives the data of the mth packet of the Nth video frame, since it is the last packet data of the Nth video frame, master receiving element 110A may calculate a second checksum data of the Nth video frame (or data checksum B) and an expected consumed current (total RGB current A). After obtaining the data checksum A and the data checksum B, the master receiving element 110A compares the data checksum A with the data checksum B to confirm whether they are consistent or inconsistent. If the data checksum A is consistent with the data checksum B, a result of a comparison (A) is output as "1", otherwise it is output as "0". In other words, after the master receiving element 110A receives the last packet data, it calculates the second checksum data and the expected consumed current of the Nth video frame, and compares the first checksum data with the second checksum data to determine whether they are consistent or inconsistent to output a first comparison result (the comparison (A)).

In an embodiment, a comparison method that compares the data checksum A with the data checksum B to confirm whether they are consistent or inconsistent is to, for example, obtain a remainder by dividing two byte data streams of the data checksum A and the data checksum B by binary division (without carry and using a logical XOR operation), where the dividend is a binary representation of information needed to calculate the checksum, and the divisor is a predetermined (shorter) binary number with a length of (m+1), which is, for example, expressed by using coefficients of a generator polynomial. Before conducting the division, m 0s are added after the information data. In an embodiment, other error correcting codes (ECC) or other data detection methods may also be used, such as BCH codes, forward error correction, error detection, etc., which are not limited by the disclosure. The other comparison methods and detailed calculations of checksum are all included in the variant embodiments conceived herein, which should be understood by those skilled in the art, and will not be repeated here.

After the data transmission element 140 transmits the data of the mth packet of the Nth video frame, it sends the synchronization packet signal VSYN to the master receiving element 110A to notify the master receiving element 110A to drive the LED board 130 to display video data or image data of the Nth video frame. Namely, the master receiving element 110A converts the video data into a driving display signal to display the video data or image data of the Nth video frame on the LED board 130. Therefore, the master receiving element 110A may measure an actual consumed current (measured current B) of the LED board 130. The master receiving element 110A then compares whether the expected total RGB current A is consistent with the actual measured current B, and if the expected total RGB current A is consistent with the actual measured current B, a result of a second comparison result (comparison (B)) is output as "1", otherwise it is output as "0".

Namely, the master receiving element 110A compares the expected consumed current as consistent or inconsistent with the actual consumed current of the LED board 130 in response to displaying the Nth video frame for outputting the second comparison result. The master receiving element 110A performs a logical AND operation on the first comparison result and the second comparison result. In response to the operation result being true (or "1"), the master receiving element 110A outputs a pulse signal (pulse) as the normal notification signal SH indicating that the master receiving element 110A is operating normally. In response to the operation result being false (or "0"), no pulse signal is output. In response to the master receiving element 110A not outputting the normal notification signal SH within a predetermined time (for example, within 1 second, which is not limited by the embodiment), then the master receiving element 110A is disabled, a control signal is output, and the slave receiving element 120 is enabled via the control signal to achieve a backup function. In other words, if the slave receiving element 120 receives the normal notification signal SH within the predetermined time (for example, within 1 second, which is not limited by the embodiment), it means that the master receiving element 110A is working normally.

Figure 6:
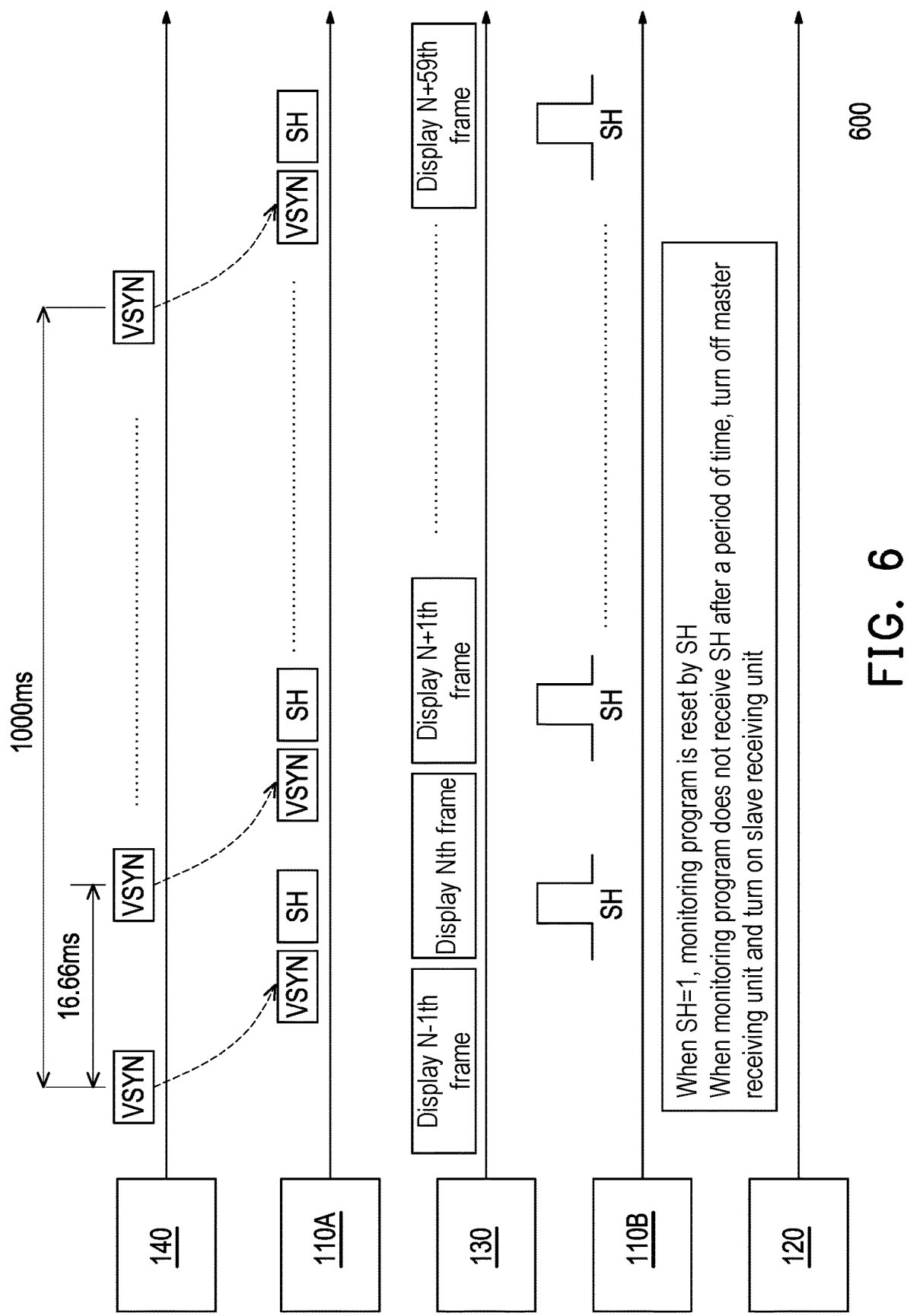
FIG. 6 is a schematic diagram of a working principle of determining failure of video transmission data according to an embodiment of the disclosure.

FIG. 6 is a schematic diagram 600 of a working principle of determining failure of video transmission data according to an embodiment of the disclosure, but this is only for the convenience of description, and is not intended to limit the disclosure.

Referring to FIG. 6, FIG. 1 and FIG. 2, in an embodiment, the data transmission element 140 may be set to transmit a synchronization packet signal VSYN to the master receiving element 110A every 16.66 milliseconds (ms). In an embodiment, the master receiving element 110A determines whether the video data is normal or abnormal after confirming the receipt of the synchronization packet signal VSYN, and sends a normal notification signal SH to the monitor device 110B every time after confirming that the video data is normal. In an embodiment, the monitor device 110B receives 60 normal notification signals SH within one second. In other words, the LED board 130 may display 60 video frame data within one second. Therefore, if there are 60 consecutive video frame data displaying errors within one second, it means that the monitor device 110B fails. It should be noted that by determining whether the monitor device 110B receives a predetermined number of normal notification signals SH within a predetermined time, it may effectively reduce misjudgment results of video or image data caused by unstable network data.

Moreover, by discriminating generation of the plurality of normal notification signals SH, the computer may have fault tolerance capability, and will not cause errors due to partial data loss. The so-called fault tolerance capability is adaptable to different transmissions. For example, instead of immediately determining an error when no normal notification signal SH is received, it may be determined by setting a threshold of the received signal, where the threshold is defined as a value greater than 1. In other words, it will not be determined as an error just because one error occurs. In addition, the setting of a magnitude of the threshold is related to an effect of visual presentation, and may be set according to the needs of the user. For example, it may be set as an acceptable result when 40 frames are correct and 10 frames are incorrect out of every 50 frames.

In an embodiment, when the monitor device 110B receives the normal notification signal SH (i.e., the normal notification signal SH="1"), a watchdog in the monitor device 110B may be reset by the normal notification signal SH. When the watchdog does not receive the normal notification signal SH after a period of time, the master receiving element 110A is turned off, and the slave receiving element 120 is turned on.

Figure 7:
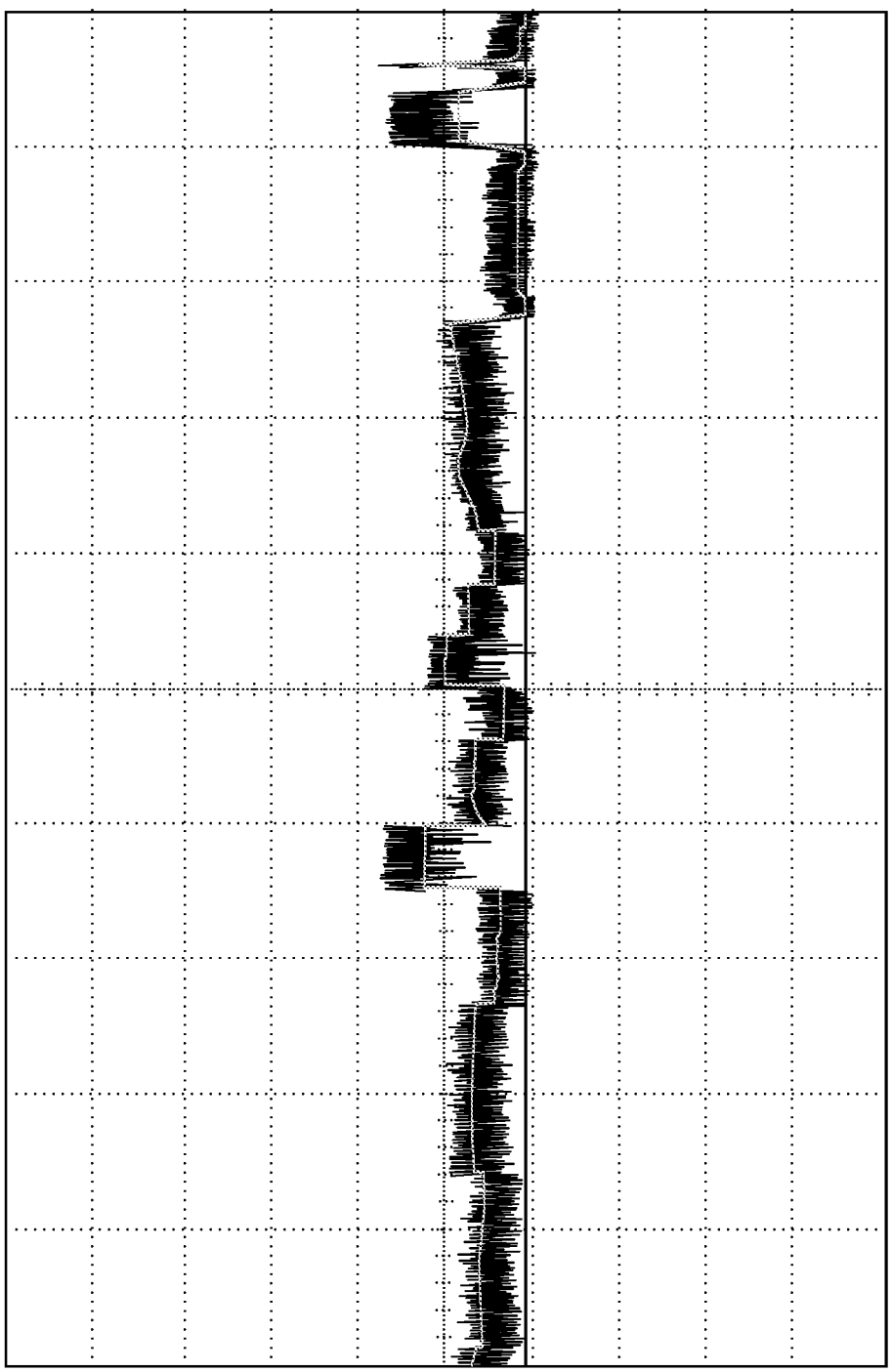
FIG. 7 is a detection method of dynamic current consumption based on input data according to an embodiment of the disclosure.

FIG. 7 is a detection method of dynamic current consumption based on input data according to an embodiment of the disclosure, but this is only for the convenience of description, and is not intended to limit the disclosure.

Referring to FIG. 7, in an embodiment, a correctness detection method of the video or image data is to dynamically (or in real-time) calculate a total current consumed by the light-emitting module of the LED board based on the input data, and measure an actual current consumed by the light-emitting module of the LED board, and compare the consumed total current predicted by calculation (i.e., a smoother wave pattern in the figure) with the measured current actually consumed by the light-emitting module (i.e., a wave pattern that changes more frequently in the figure) to determine whether they are consistent or inconsistent, so as to estimate whether the receiving device fails. It should be noted that the embodiment is more accurate compared with the situation that the receiving device uses a predetermined fixed threshold, where if the error number is greater than or smaller than the fixed threshold, the receiving device is determined to be failed.

FIG. 8A to FIG. 8C are data structure configuration diagrams of each video frame packet according to an embodiment of the disclosure, but this is only for the convenience of description, and is not intended to limit the disclosure.

Referring to FIG. 8A to FIG. 8C, in an embodiment, the data transmission element 140 may, for example, convert HDMI into an RJ45 data format and send it to the master receiving element 110A. The video frame packet data transmitted by the data transmission element 140 is exemplified by video data of HDMI 1920×1080, but the disclosure is not limited thereto. Regarding a resolution described by the video data, for example, a resolution of each LED light box is 240×135 pixels, and each pixel is composed of red (R), green (G) and blue (B) pixels. In an embodiment, each color is represented by 8 bits (8-bits=1 byte). Therefore, a video data size of one light box is 240 (width)×135 (length)×3 (3 bytes), i.e., 97200 bytes, but the disclosure is not limited thereto.

Referring to FIG. 8A, in an embodiment, a size of the first to Nth video frame packet data is 546 bytes, and a data structure thereof includes a head ID field, a video data field and a cyclic redundancy check (CRC) packet (CRC-packet) data field. Where, CRC is a hash function that generates a fixed-digit verification code based on data such as network data packets or computer files, etc. The CRC is used to detect or verify errors that may occur after data transmission or storage. In an embodiment, the CRC may calculate a generated number before transmission or storage, and may append it to the back of the original data, and a receiver check the number to determine whether the data has changed. In addition, since the CRC may perform other mathematical detection and analysis, it is suitable for detecting data transmission errors caused by interference in a transmission channel.

In an embodiment, a size of the head ID field is 2 bytes, but the disclosure is not limited thereto. In an embodiment, 0xFFAA represents a first packet in the video packet data. 0xFFBB represents an Nth packet in the video packet data.

In an embodiment, a size of the video data field is 512 bytes, but the disclosure is not limited thereto.

In an embodiment, a size of the CRC-packet data field is 4 bytes. The CRC packet uses CRC-32 as a data check to check the corresponding video frame packet data. Where, for the generator polynomial of CRC-32, reference may be made to related literature, and detail thereof is not repeated here.

Referring to FIG. 8B, in an embodiment, a size of the last video frame packet data is 522 bytes, but the disclosure is not limited thereto, and a data structure thereof includes the head ID field, the video data field, a CRC-frame data field and the CRC-packet data field.

In an embodiment, a size of the head ID field is 2 bytes. In an embodiment, 0xFFCC represents a last packet in the video packet data of the video frame.

In an embodiment, a size of the video data field is 512 bytes.

In an embodiment, a size of the CRC-frame data field is 4 bytes. The CRC-frame data uses CRC-32 as a data check to check the corresponding video frame data. For the generator polynomial of CRC-32, reference may be made to related literature, which should be understood by those skilled in the art, and detail thereof is not repeated here.

In an embodiment, a size of the CRC-packet data field is 4 bytes. The CRC package data uses CRC-32 as the data check to checks the package data of the corresponding video frame.

Referring to FIG. 8C, in an embodiment, a size of the packet data of the synchronization packet signal is 520 bytes, and a data structure thereof includes the head ID field, a transmission data (information) field and the CRC-packet data field.

In an embodiment, a size of the head ID field is 2 bytes. In an embodiment, 0xFFFF represents synchronization packet signal data.

In an embodiment, a size of the transmission data field is 512 bytes. In an embodiment, the transmission data field is a reserved field, and all data therein is 0x00.

In an embodiment, a size of the CRC-packet data field is 4 bytes. The CRC package data uses CRC-32 as the data check to check the package data of the corresponding video frame.

Figure 9:
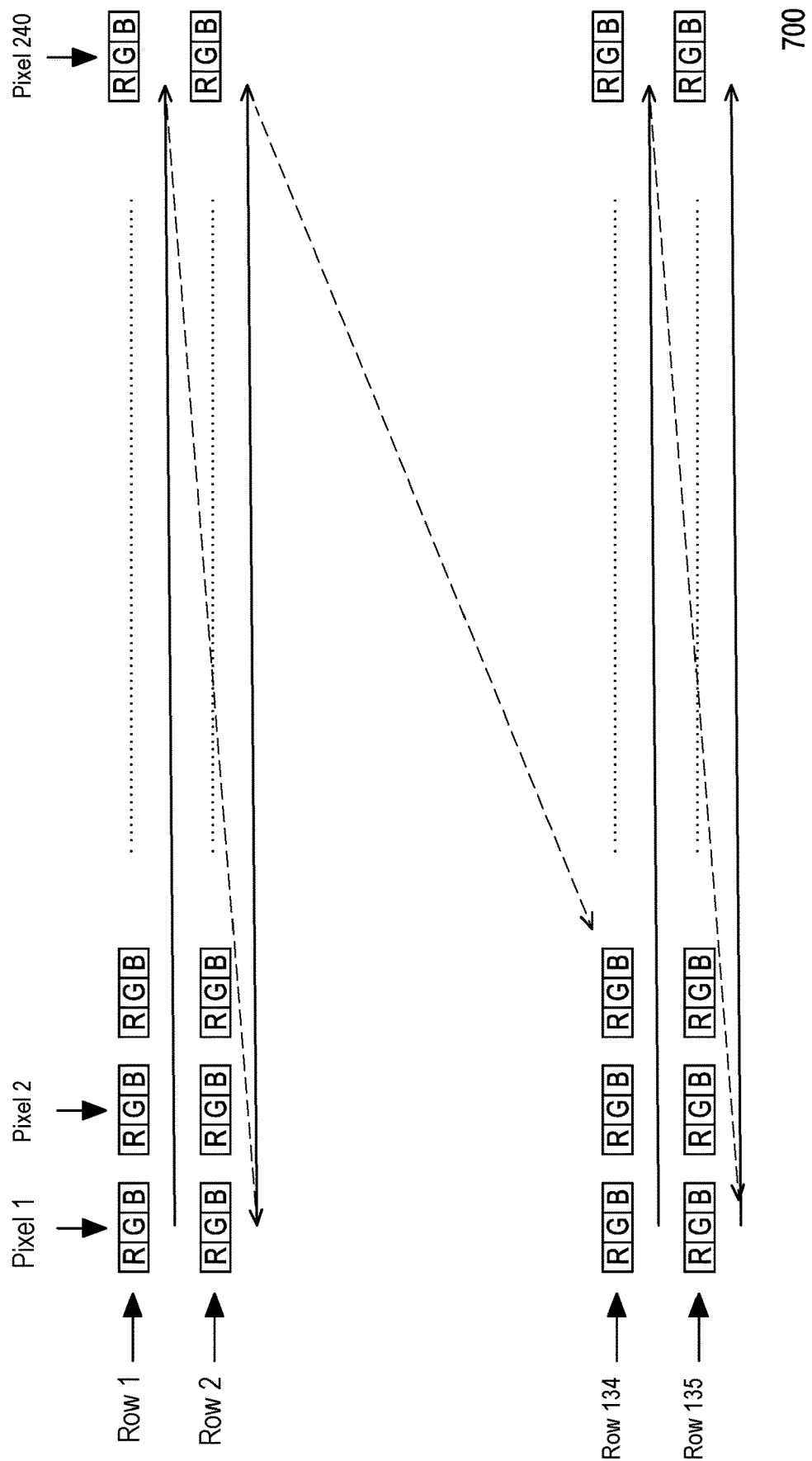
FIG. 9 is a schematic diagram of a reading sequence of video data according to an embodiment of the disclosure.

FIG. 9 is a schematic diagram 700 of a reading sequence of video data according to an embodiment of the disclosure, but this is only for the convenience of description, and is not intended to limit the disclosure.

Referring to FIG. 9, in an embodiment, the video data or image data of a light box requires 190 (97200/512≈190) video frame packets. Where, the video frame packets less than 512 units are filled with zeros. An arrangement sequence of the video data is first row first, and then sequentially from a first column to the last column, such as the first column (pixel 1) to a 240th column (pixel 240). The rightmost pixel (or pixel) of each column has priority. For example, the arrangement sequence is from the blue pixel to the green pixel to the red pixel, and from the rightmost first pixel to the leftmost last pixel. Regarding sizes of the pixel R/G/B data, a sequence thereof is the red pixel (1 byte), the green pixel (1 byte) and the blue pixel (1 byte). In other words, its resolution is 240 columns in pixel width and 135 rows in pixel length. Namely, there are 240 pixels in a line, and each pixel contains RGB units.

Figure 10:
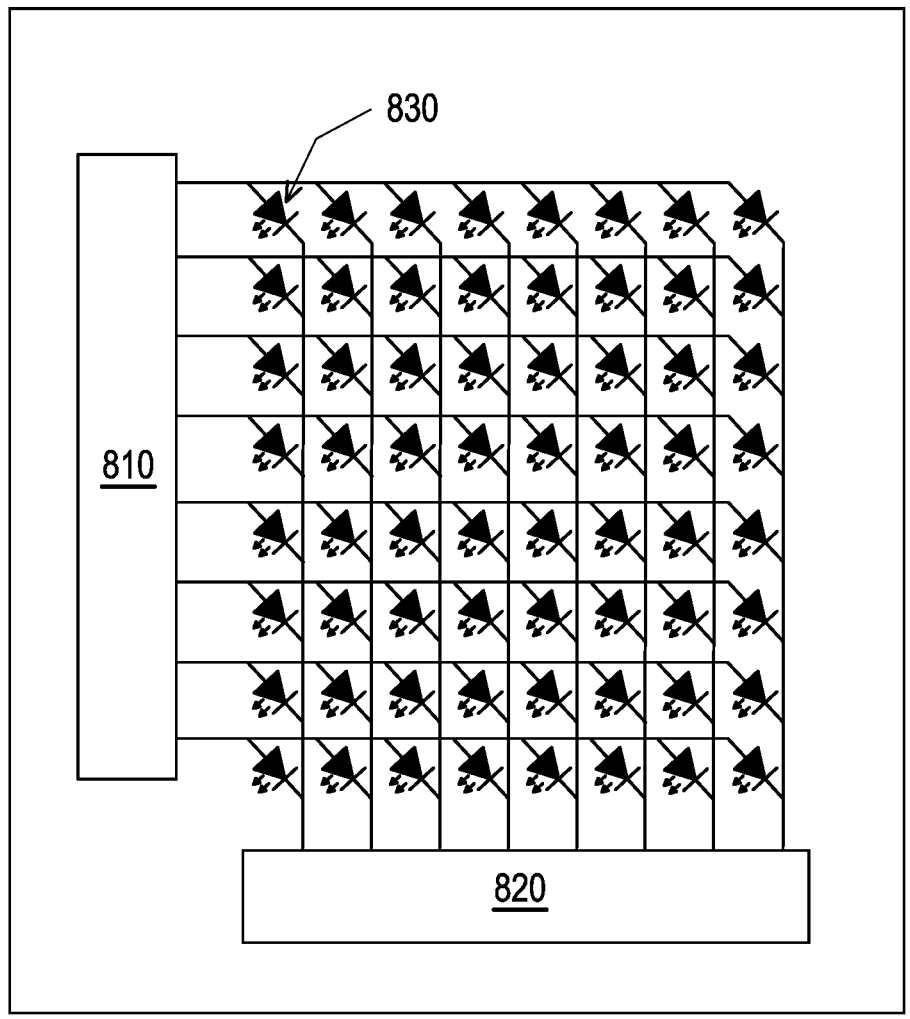
FIG. 10 is a schematic diagram of an LED board according to an embodiment of the disclosure.

FIG. 10 is a schematic diagram of an LED board according to an embodiment of the disclosure, but this is only for the convenience of description, and is not intended to limit the disclosure.

Referring to FIG. 10, in an embodiment, an LED board 800 includes a switch IC 810, a scan IC (scan IC) 820 and light-emitting elements 830. The light-emitting elements 830 are coupled to the switch IC 810 and the scan IC 820. The switch IC 810 may sequentially switch the light-emitting elements 830 (for example, LED lamps) whose brightness is to be adjusted. Namely, the switch IC 810 may switch row by row. For example, the switch IC 810 may perform sequential scanning, i.e., to scan the first row first, and then scan the second row, the third row, and so on. In an embodiment, regarding each light-emitting element 830 (LED lamp), CCM color conversion is first performed, and then a brightness is adjusted through the LED board 800 (since the brightness of each LED may be uneven) to perform brightness conversion, and finally the converted data is output to the scan IC 820. For example, regarding the pixel data of RGB, the darkest is 0, and the brightest is 255 (LED lamps are fully on). After the pixel data is received by the master receiving element, it is converted into 16 bits by the gamma table. In other words, the final data driven by the LED board 800 is 16 bits.

In an embodiment, the current consumption of the LED board 800 may be divided into two parts: constant current consumption and dynamic current consumption. Namely, an expected value of the estimated current consumption includes the constant current consumption and the dynamic current consumption. Where, the switch IC 810 and the scan IC 820 and other passive electronic components (such as resistors or related electronic components) may generate the constant current consumption. The dynamic current consumption is mainly generated by the light-emitting elements 830. A change of the constant current consumption and the dynamic current consumption may be obtained through a current probe of an oscilloscope. In an embodiment, when the LED lamps are fully on, the red pixel unit needs the largest current, the green pixel unit needs the second largest current, and the blue pixel unit needs the least current.

Figure 11:
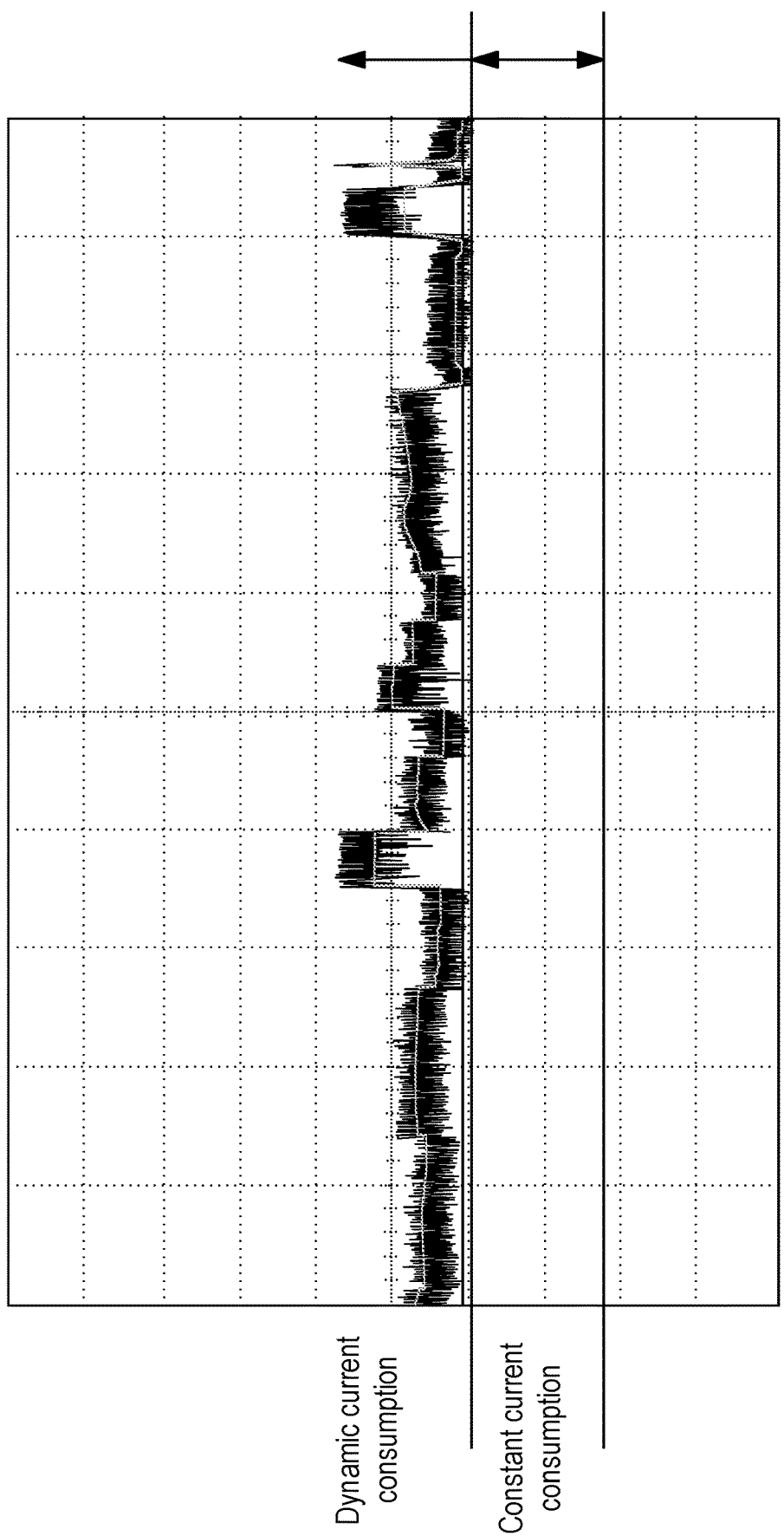
FIG. 11 is diagram illustrating dynamic current consumption and constant current consumption according to an embodiment of the disclosure.

FIG. 11 is diagram illustrating the dynamic current consumption and the constant current consumption according to an embodiment of the disclosure, but this is only for the convenience of description, and is not intended to limit the disclosure.

Referring to FIG. 11 and FIG. 2, in an embodiment, the constant current consumption is measured by actual hardware. First, the receiving device 200 is set up according to FIG. 2 and power supply is connected thereto. When the data output element 150 (for example, PC) transmits a black image (black screen) to the data transmission element 140, at this time, the LED board 130 displays a black image, i.e., all LED lamps are turned off. A value of the constant current consumption may be obtained by reading the consumed current of the LED board 130 through the master receiving element 110A. In this step, a measured value ($A_{(i)Fixed}$) of the constant current consumption of at least one LED board 800 may be averaged to obtain a more accurate value of the constant current consumption. For example, the entire receiving device 200 in FIG. 2 has multiple (1–n) LED light boxes, which all display black images first, and the values ($A_{(i)Fixed}$) of the measured current consumption are summed and then divided by a total number of the light boxes (n) to obtain an average value, so that an average constant current consumption value ($A_{Fixed}$) is obtained. Where, a purpose of taking the average value is that each electronic component has a maximum value, a minimum value and typical data. A calculation method thereof is as follows.

Constant current consumption calculation formula:

$$A_{Fixed}/ = \frac{\sum_{i=1}^{n} A_{(i)Fixed}}{n}.$$

In an embodiment, in an embodiment, the dynamic current consumption ($A_{Dynamic}$) is mainly generated by the light-emitting elements 830 (LED lamps), and the dynamic current value may be obtained through two methods of calculating and estimating a total dynamic consumed current of each light-emitting element 830 and actually measuring a total dynamic consumed current of each light-emitting element 830.

In an embodiment, the HDMI video data sent by the data output element 150 is 8-bit ($Pixel_{raw\ r/g/b}$), and a brightness thereof ranges between 0 and 255 levels from the darkest to the brightest. The HDMI video data is transmitted to the master receiving element 110A through the data transmission element 140. After the master receiving element 110A receives the 8-bit (R/G/B) HDMI video data, the 8-bit (R/G/B) HDMI video data is converted into 16-bit (R/G/B) data (Gamma($Pixel_{raw\ r/g/b}$)) through the gamma table. Then, after the CCM color correction and brightness conversion, the data is transmitted to the scan IC 820 in the LED board 800 for implementing LED driving and scanning, and an expression thereof is as follows.

$Pixel_{raw\ r/g/b\ value}$=Brightness(CCM(Gamma($Pixel_{raw\ r/g/b}$))).

In an embodiment, a scan refresh rate of the light-emitting element 830 of the scan IC 820 is set to 3840 Hz, an effective bit of driving the light-emitting element 830 is set to 16 bits, and driving currents of the light-emitting element 830 (R/G/B) are respectively set to 10 milliamperes (mA) ($I_{SET\_R}$), 6.3 mA ($I_{SET\_G}$) and 5.4 mA ($I_{SET\_B}$), the brightest of the light-emitting element 830 (LED) is 0xFFFFFFFF, and the darkest of the LED (turned off) is 0x00000000.

In an embodiment, the currents ($I_{LED\_R}$, $I_{LED\_G}$, $I_{LED\_B}$) consumed by each light-emitting element 830 (R/G/B) are respectively as follows.

$$I_{LED\_R} = \frac{Pixel_{r\ value}}{2^{16} - 1} \times I_{SET\_R} \times \frac{1}{Refresh\ rate}$$

$$I_{LED\_G} = \frac{Pixel_{g\ value}}{2^{16} - 1} \times I_{SET\_G} \times \frac{1}{Refresh\ rate}$$

$$I_{LED\_B} = \frac{Pixel_{b\ value}}{2^{16} - 1} \times I_{SET\_B} \times \frac{1}{Refresh\ rate}$$

Therefore, the estimated total consumed current ($Current_{Total}$) of the LED board 130 is a sum of the constant current consumption ($A_{Fixed}$) and the dynamic current consumption of all light-emitting elements 830 in length and width directions of the entire LED board 130, and a calculation equation thereof is as follows:

$$Current_{Total} = A_{Fixed} + \sum_{x=1}^{width} \sum_{y=1}^{length} I_{LED\_R(x,y)} + I_{LED\_G(x,y)} + I_{LED\_B(x,y)}$$

In an embodiment, the total consumed current ($Current_{Total}$) of the LED board 800 may be calculated according to actual measurement. First, the receiving device 200 is set up according to FIG. 2 and power supply is connected thereto. The data output element 150 transmits a black image to the data transmission element 140, and at this time, the LED board 130 displays the black image, i.e., all light-emitting elements (LEDs) are in a turn-off state. The constant current consumption ($A_{Fixed}$) may be obtained by reading the current consumed by the device LED board 130 through the master receiving element 110A. For example, when the data output element 150 transmits a red (grayscale 1-255) video or video frame to the data transmission element 140, the LED board 130 displays a red (grayscale 1-255) video or video frame. Namely, all of the light-emitting elements display red (grayscale 1-255). By reading the current consumed by the LED board 130 through the master receiving element 110A, the constant current consumption ($A_{FixedR(level1\sim255)}$) of a red LED unit may be obtained.

Therefore, a calculation method of a consumed current $I_{LED\_R'\ (level\ 1\sim255)}$ of each grayscale of the LED is as follows:

$$I_{LED\_R'\ (level\ 1\sim255)} = \frac{A_{FixedR(level\ 1\sim255)} - A_{Fixed}}{width \times length}$$

Similarly, the constant current consumption ($I_{LED\_G'\ (level\ 1\sim255)}$) of a green LED unit and the constant current consumption ($I_{LED\_B'\ (level\ 1\sim255)}$) of the red LED unit may be calculated according to the above method.

Therefore, the estimated total consumed current (Current$_{Total}$) of the LED board 130 is a value obtained by adding the constant current ($A_{Fixed}$) to a sum of the dynamic consumed current actually measured by all of the light-emitting elements 830 in the length and width directions of the entire LED board 130 after brightness conversion, and a calculation equation thereof is as follows:

$$\text{CurrentTotal} = A_{Fixed} + \text{Brightness}\left(\sum_{x=1}^{width}\sum_{y=1}^{length} I_{LED\_R'(Pixel\ raw\ r_{(x,y)})} + I_{LED\_G'(Pixel\ raw\ g_{(x,y)})} + I_{LED\_B'(Pixel\ raw\ b_{(x,y)})}\right)$$

Figure 12:
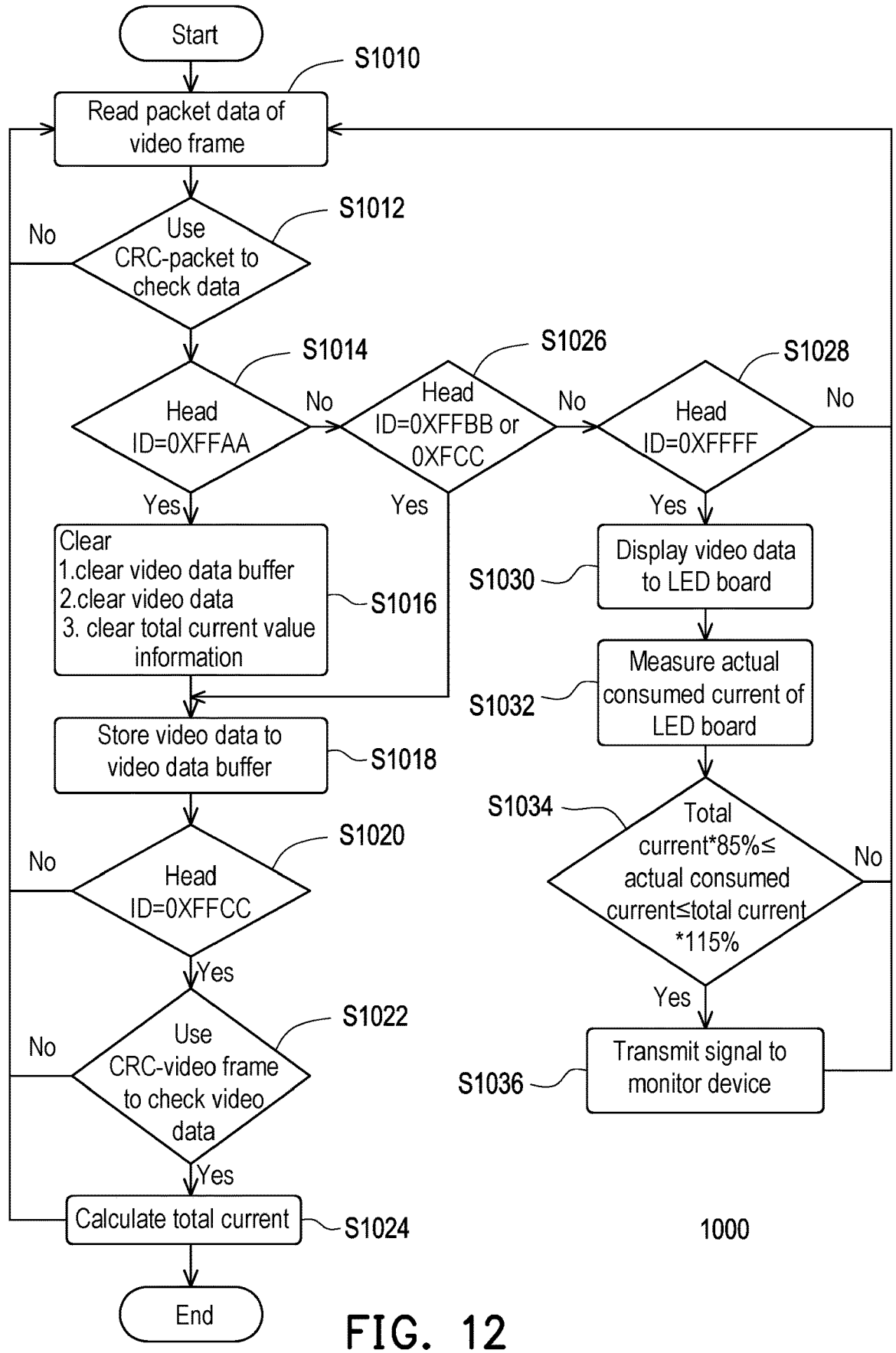
FIG. 12 is an operation flowchart of a receiving device according to an embodiment of the disclosure.

FIG. 12 is an operation flowchart of a receiving device according to an embodiment of the disclosure, but this is only for the convenience of description, and is not intended to limit the disclosure.

Referring to FIG. 12, in an embodiment, steps S1010-S1036 in the operation flowchart 1000 are an operation flow of a master receiving element. In step S1010, the master receiving element reads video frame packet data. In step S1012, the master receiving element checks whether a CRC-packet data is correct. In step S1014, the master receiving element confirms whether a head ID is 0XFFAA and whether the corresponding video frame is a first video frame packet data. In step S1016, if the master receiving element determines that the video frame is the first video frame packet data, the master receiving element clears a video data buffer, and clears the video data and a value of total current value information (Current$_{Total}$) to zero.

In step S1018, the master receiving element stores the video data into the video data buffer. In step S1020, the master receiving element confirms whether the head ID is 0xFFCC. In step S1022, the master receiving element calculates whether the video data conforms to a CRC-video frame. In step S1024, the master receiving element determines that the video data is correct, and then calculates the total current value information (Current$_{Total}$). In step S1026, the master receiving element confirms whether the head ID is 0XFFBB or 0XFFCC. In step S1028, the master receiving element confirms whether the head ID is 0XFFFF, and if correct, it is a packet signal. In step S1030, the master receiving element displays the video data on a LED board.

In step S1032, the master receiving element measures the actual consumed current (Current$_{Total}$) of the LED board. In step S1034, the master receiving element determines whether the actual consumed current on the LED board is between eighty-five percent (85%) of the estimated total current and one hundred and fifteen percent (115%) of the estimated total current. Namely, Current$_{Total}$*85%≤Current$_{Real}$≤Current$_{Total}$*115%. It should be noted that in an embodiment, when the LED brightness is corrected, a 10% current adjustment interval is set, and an additional 5% error interval is set when detecting the current, so that it is correct if the current is within ±15% of an error value. In step S1036, if the master receiving element detects that the received current is correct, the master receiving element sends a pulse wave signal with a period of 1 ms to a monitor device.

Figure 13:
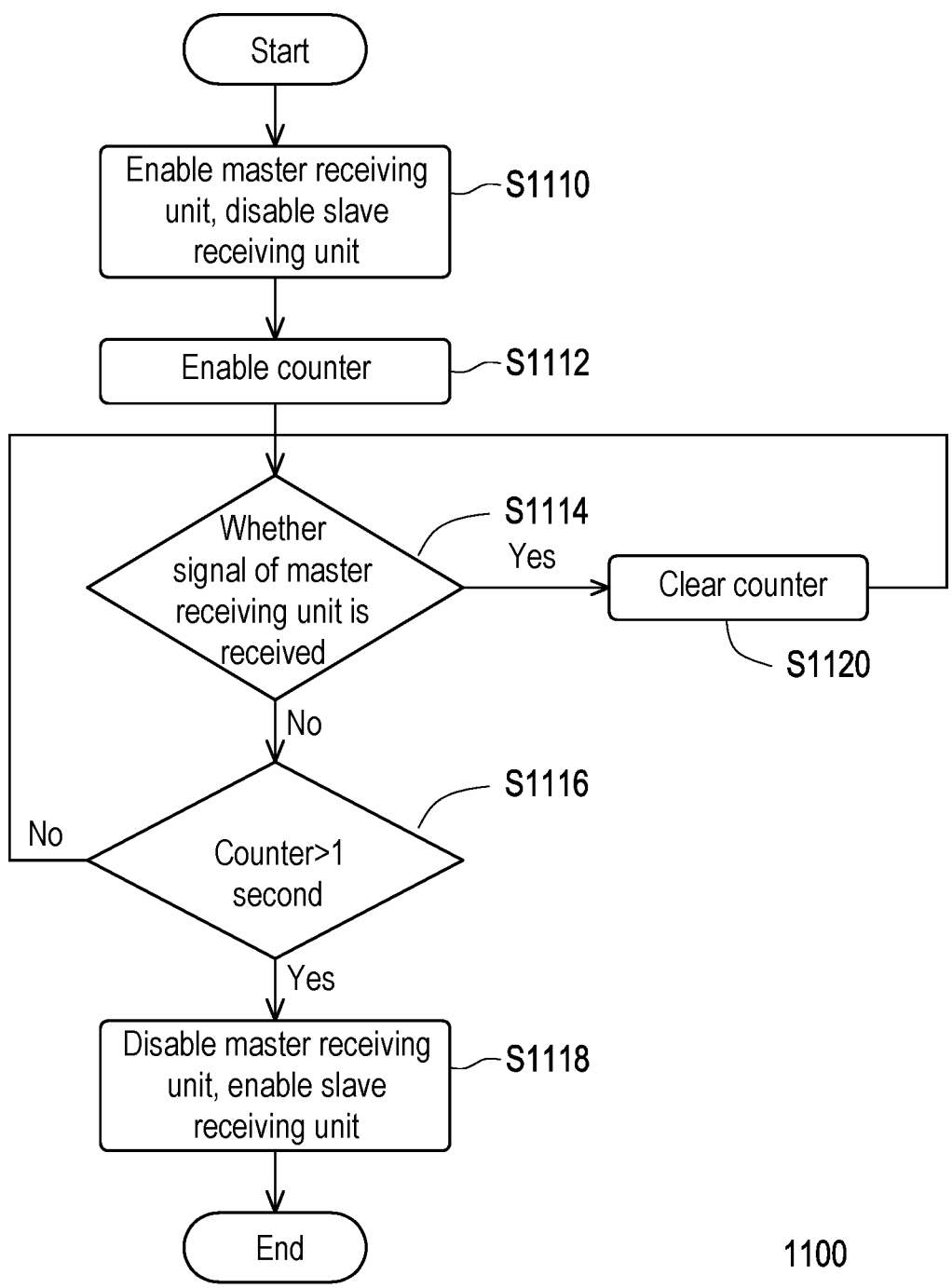
FIG. 13 is an operation flowchart of a monitor device according to an embodiment of the disclosure.

FIG. 13 is an operation flowchart of a monitor device according to an embodiment of the disclosure, but this is only for the convenience of description, and is not intended to limit the disclosure.

Referring to FIG. 13, in an embodiment, steps S1110-S1120 in the operation flowchart 1100 are an operation flow of the monitor device. In step S1110, the monitor device enables the master receiving element to work normally, and disables the slave receiving element to be in the standby mode. In step S1112, the monitor device enables a timer, so that the timer starts to count. In step S1114, the monitor device determines whether a pulse wave signal transmitted by the master receiving element is received. In step S1116, the monitor device detects whether a time of the timer is greater than 1 second to confirm whether a normal notification signal is received within a predetermined time. In step S1118, the monitor device detects that the timer time is greater than 1 second, then disables the master receiving element for unloading, and enables the slave receiving element to replace the master receiving element. In step S1120, the monitor device clears the timer to zero after receiving the pulse wave signal sent by the master receiving element.

In summary, based on the above descriptions, the disclosure uses the receiving device with a redundant design to support packet detection of video data and current comparison detection that dynamically calculates a consumed current based on the input data and measures an actual consumed current to determine whether the device fails as an enabling mechanism of a backup device or backup system, which is convenient for terminal users to enable the backup device in real-time when the receiving device is partially damaged, without worrying about the problem that the video data is not transmitted to the LED wall in real-time due to signal transmission errors or internal system damage.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A receiving device, comprising:
   a data transmission element, converting a first video data into a second video data;
   a master receiving element, coupled to the data transmission element, comprising a first processing circuit, wherein the first processing circuit is configured to receive the second video data, and determine whether the second video data is normal or abnormal; and
   a slave receiving element, coupled to the master receiving element and the data transmission element, comprising a second processing circuit, wherein the second processing circuit is configured to receive a control signal from the master receiving element and the second video data,
   wherein the first processing circuit is further configured to:
   in response to determining that the second video data is normal, output the control signal to control the second processing circuit to enter a standby mode, and the second video data is converted into a display signal; or
   in response to determining that the second video data is abnormal, output the control signal, and the received second video data is converted into the display signal by the second processing circuit via the control signal.

2. The receiving device according to claim 1, wherein during operation of the receiving device, the second video data is converted into the display signal by the first processing circuit or the second processing circuit.

3. The receiving device according to claim 1, further comprising:
a light-emitting diode board, coupled to the master receiving element and the slave receiving element, receiving the display signal, wherein a plurality of light-emitting elements are driven on the light-emitting diode board via the display signal, and outputting a third video data.

4. The receiving device according to claim 3, wherein the light-emitting diode board is driven by the first processing circuit, and a corresponding display video frame is displayed based on a synchronization packet signal transmitted by the data transmission element.

5. The receiving device according to claim 4, wherein a video frame of the first video data is divided into a plurality of packet data by the data transmission element.

6. The receiving device according to claim 5, wherein in response to outputting a last packet data of the video frame, a first checksum data is added to the last packet data by the data transmission element.

7. The receiving device according to claim 6, wherein the first processing circuit further configured to:
receive the last packet data;
calculate a second checksum data and an expected consumed current of the video frame;
compare the first checksum data and the second checksum data as consistent or inconsistent; and
output a first comparison result.

8. The receiving device according to claim 6, wherein one of the plurality of packet data transmitted by the data transmission element is received by the first processing circuit, and a checksum operation and a current accumulation operation of the video frame are performed on one of the plurality of packet data, wherein the current accumulation operation of the video frame is performed based on an expected consumed current corresponding to each of the plurality of packet data.

9. The receiving device according to claim 7, wherein the expected consumed current is compared as consistent or inconsistent with an actual consumed current of the light-emitting diode board by the first processing circuit, in response to displaying the video frame for outputting a second comparison result.

10. The receiving device according to claim 9, wherein a logical AND operation on the first comparison result and the second comparison result is performed by the first processing circuit, wherein in response to an operation result being true, a notification signal indicating a normal operation of the master receiving element is output, and in response to the notification signal not being output within a predetermined time, the master receiving element is disabled, the control signal is output, and the slave receiving element is enabled via the control signal.

11. An operation method of a receiving device, comprising:
converting a first video data into a second video data;
receiving the second video data and determining whether the second video data is normal or abnormal; and
receiving a control signal from the master receiving element and the second video data,
wherein in response to determining that the second video data is normal, the control signal is output to control the slave receiving element to enter a standby mode, and the second video data is converted into a display signal, or
in response to determining that the second video data is abnormal, the control signal is output, and the received second video data is converted into the display signal via the control signal.

12. The operation method according to claim 11, wherein during operation of the receiving device, the second video data is converted into the display signal.

13. The operation method according to claim 11, further comprising:
receiving the display signal, wherein a plurality of light-emitting elements are driven on a light-emitting diode board via the display signal, and outputting a third video data.

14. The operation method according to claim 13, further comprising:
driving the light-emitting diode board, and displaying a corresponding display video frame based on a synchronization packet signal transmitted.

15. The operation method according to claim 14, further comprising:
dividing a video frame of the first video data into a plurality of packet data.

16. The operation method according to claim 15, wherein in response to a last packet data of the video frame being output, a first checksum data is added to the last packet data.

17. The operation method according to claim 16, further comprising:
receiving the last packet data and calculating a second checksum data and an expected consumed current of the video frame; and
comparing the first checksum data and the second checksum data as consistent or inconsistent and outputting a first comparison result.

18. The operation method according to claim 16, further comprising:
receiving one of the plurality of transmitted packet data, and performing a checksum operation and a current accumulation operation of the video frame on one of the plurality of packet data, wherein the current accumulation operation of the video frame is performed based on an expected consumed current corresponding to each of the plurality of packet data.

19. The operation method according to claim 17, further comprising:
comparing the expected consumed current as consistent or inconsistent with an actual consumed current of the light-emitting diode board in response to displaying the video frame for outputting a second comparison result.

20. The operation method according to claim 19, further comprising:
performing a logical AND operation on the first comparison result and the second comparison result, and outputting a notification signal indicating a normal operation of the master receiving element in response to an operation result being true, wherein in response to the notification signal not being output within a predetermined time, the master receiving element is disabled, the control signal is output, and the slave receiving element is enabled via the control signal.

* * * * *